Patented Sept. 15, 1953

2,652,348

UNITED STATES PATENT OFFICE 2,652,348

ANTISTATIC TREATMENT OF SHAPED ARTICLES COMPRISING A VINYL RESIN AND TREATED ARTICLES

Joseph J. Carnes, Greenwich, and William T. Booth, Jr., Springdale, Conn., assignors to American Cyanamid Company, New York, N. Y., a corporation of Maine No Drawing. Application July 21, 1950, Serial No. 175,296

11 Claims. (Cl. 117—138.8)

This invention relates broadly to the treatment of shaped articles, and more particularly to the treatment of shaped articles comprising a thermoplastic vinyl resin with an antistatic agent, and to the treated articles. The invention especially is concerned with a method of conditioning a shaped article (e. g., in the form of a fiber, film, etc.) comprising or composed of a thermoplastic vinyl resin to lessen its tendency to accumulate static charges of electricity thereon by contacting such an article with an antistatic agent comprising a sulfosuccinate salt represented by the general formula I.
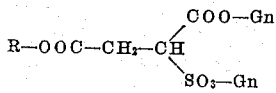

where R represents a long-chain aliphatic (saturated or unsaturated aliphatic) radical and Gn represents a cationic salt-forming substance of the class consisting of guanidine, lower-alkylguanidines (e. g., mono-, di- and trimethylguanidines, mono-, di- and triethylguanidines, mono-, di- and tripropylguanidines, mono-, di- and tributylguanidines, mono-, di- and triamylguanidines, mono-, di- and trihexylguanidines, etc.), phenylguanidines (e. g., mono- and diphenylguanidines, etc.), alkylolguanidines [e. g., mono-, di- and tri-(hydroxymethyl)-, mono-, di- and tri-(hydroxyethyl)-, mono-, di- and tri-(hydroxypropyl)-, mono-, di- and tri-(hydroxybutyl)-, mono-, di- and tri-(hydroxyamyl)-guanidines, etc.], guanylurea, biguanide and phenylbiguanides (e. g., mono- and diphenylbiguanides, etc.). When R in Formula I represents a long-chain aliphatic (saturated or unsaturated aliphatic) hydrocarbon radical, said radical can contain, for example, from 10 to 32 or more carbon atoms, but preferably contains from 12 to 18 carbon atoms, inclusive.

Examples of compounds and classes of compounds embraced by Formula I, all of which are diguanidine or di-(substituted guanidine) salts of an ester of sulfosuccinic acid, are:

Decyl to octodecyl, inclusive, diguanidine sulfosuccinates
Decyl to octadecyl, inclusive, bis-(alkylolguanidine) sulfosuccinates
Decyl to octadecyl, inclusive, bis-(lower-alkylguanidine) sulfosuccinates
Decyl to octadecyl, inclusive, bis-(phenylguanidine) sulfosuccinates
Decyl to octadecyl, inclusive, bis-(guanylurea) sulfosuccinates
Decyl to octadecyl, inclusive, bis-(biguanide) sulfosuccinates
Decyl to octadecyl, inclusive, bis-(phenylbiguanide) sulfosuccinates Compounds represented by the general formula II
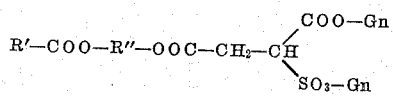

where R' represents a long-chain aliphatic hydrocarbon radical, e. g., one containing from 9 to 17 carbon atoms, inclusive, or even as high as 29 or more carbon atoms, R'' represents an alkylene radical or a hydroxyalkylene radical, each of which contains from 2 to 5 carbon atoms, inclusive, and Gn has the same meaning as given above with reference to Formula I.

Compounds represented by the general formula

III
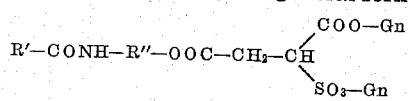

where R' and R'' have the same meanings as given above with reference to Formula II, and Gn has the same meaning as in Formulas I and II.

It was known to our invention that the alkyl esters of sulfosuccinic acid, and particularly the neutral and acid esters of this acid with aliphatic alcohols containing from 4 to 9 carbon atoms, inclusive, were effective wetting, penetrating and emulsifying agents when used in the form of their sodium salts. It was also known (see Langhorst et al. Patent No. 2,265,944) that certain amidine salts of the aforementioned esters of sulfosuccinic acid e. g., monoguanidine dioctyl sulfosuccinate, could be prepared, and that these amidine salts possessed desirable surface-active properties for certain fields of application, more particularly as additives to photographic developing solutions and blueprint emulsions, and as demulsifying agents for breaking emulsions of the water-in-oil type.

We have found that compounds of the kind embraced by Formula I can be prepared in excellent yields by a practical, relatively inexpensive method, and that they have certain unique properties which make them especially suitable for use in particular applications. Specifically we have found that salts of sulfosuccinates of the kind represented by Formula I have, because of their particular and peculiar constitution, the unique characteristic of obviating or materially lessening the tendency of articles to accumulate static charges of electricity thereon, which articles, in a dry state, normally (that is, in their normal or untreated condition) have this tendency to accumulate electrostatic charges. Illustrative examples of articles which, when dry, tend to accumulate charges of electricity are woolen and silk fabrics, viscose and cellulose acetate rayon fabrics, fabrics made from thermoplastic vinyl resins, nylon (a synthetic linear polyamide) and other synthetic linear polymers of the kind disclosed (for example, in Patents 2,071,250–1.

Various methods may be employed in producing the compounds of the present invention. A preferred method includes, as a first step, the reaction of a long-chain aliphatic material containing an alcoholic hydroxyl group with maleic anhydride or acid, preferably the anhydride, to form the maleic mono-ester. This maleic mono-ester is then reacted with a sulfite salt of guanidine or other compound of the kind represented by Gn in Formula I. The reaction is preferably carried out in water or in a mixture of water and ethyl or other suitable alcohol. The sulfosuccinate salt thereby produced can be isolated from the reaction mass by any suitable means, for example, by filtration, by centrifuging, by merely evaporating the solvent, or by partial evaporation of the solvent to the point where the salt crystallizes from the cold solution, and then separating the crystalline salt from the mass by filtration, centrifuging or other suitable means. The crude salts can be purified, if desired, by recrystallization from a suitable solvent, e. g., water, mixtures of water and alcohol, etc.

We have found that it is not possible to prepare and isolate, by any practical means, the sulfosuccinate salts of our invention by conversion of the disodium salts to the corresponding diguanidine salts, as is possible with the mono-sodium salts of the dialkyl sulfosuccinates, due to the insolubility of the disodium salts in organic solvents. Surprisingly, however, it was found that salts of sulfosuccinates of the kind embraced by Formula I could be prepared advantageously by the general procedure just described.

The maleic mono-ester ordinarily is prepared by reacting the aliphatic material containing an alcoholic hydroxyl group with a slight excess over one equivalent of maleic anhydride at a temperature of 50°–150° C. preferably 70°–90° C. The reaction is generally complete at the end of from 1 to 4 hours, depending upon the temperature employed, the particular reactants used and other influencing factors. The course of the reaction is followed by making determinations of the acid number of the reaction mixture from time to time. The values for acid number which are obtained are usually a few units higher than the theoretical acid number because of the slight excess of maleic anhydride used in the esterification. Obviously, if desired, maleic acid can be used instead of maleic anhydride in preparing the maleic mono-ester.

The sulfite of the guanidine compound can be prepared, for example, by reaction of the free base or its carbonate with sulfur dioxide in aqueous or aqueous alcoholic solution. If the free base or carbonate of the guanidine compound is not commercially available, it can be produced by known procedures from other salts of the guanidine compound, for instance, from the sulfate or hydrochloride thereof. The second step of the preparation is usually carried out by adding the maleic mono-ester in portions to a solution (for example, an aqueous or an aqueous alcoholic solution) of the guanidine or substituted guanidine sulfite, while maintaining the latter at a temperature of from about 80° C. to 90° C. In the preferred method of preparation, the portions of the maleic mono-ester are added at such a rate that one portion has completely reacted with the sulfite before the next portion is added. When the addition of the maleic mono-ester to the solution of the sulfite has been completed, the reaction is usually allowed to proceed for a suitable additional period, e. g., for 1 to 2 hours or more, in order to insure that complete reaction of all of the maleic mono-ester has occurred. The completeness of the reaction can be checked by iodometric titration for unreacted sulfite. At the end of the reaction period, the reaction mass, when cool, is usually either a solution, slurry or paste, depending upon the particular sulfosuccinate salt which is being prepared. This reaction mass can be used as such, if desired (or after diluting it with water or other liquid medium if necessary), in such applications as, for instance, antistatic treatments, softening of textiles, as lubricating oil detergents, etc. The sulfosuccinate salt can be obtained in solid form merely by evaporation of the solvent from the reaction mass, or by other means such as have been mentioned hereinbefore.

In using the salts of the kind embraced by Formula I as antistatic agents, a solution or dispersion of the salt is applied by any suitable means to the article which, in a dry state, normally has a tendency to accumulate static charges of electricity, followed by drying of the treated article to volatilize the solvent or liquid component. The treatment is applicable to such articles in various forms, for instance, in the form of filaments, fibers, yarns, films, woven, knitted and felted fabrics, etc. These sulfosuccinate salts are particularly useful as antistatic finishes for fabrics made of thermoplastic vinyl resins, including polymeric and thermoplastic copolymeric acrylonitrile polymerization products, etc.

As is well known to those skilled in the art, the vinyl resins constitute a class of materials which develop or tend to develop an electrostatic charge upon their surfaces when fibers or other articles made therefrom are subjected to friction during their production and during processing or fabrication of the fibers into fabric or other articles, as well as during the use of the finished article. The sulfosuccinate salts of the kind embraced by Formula I (including compounds of the kind covered by Formulas II and III) have been found to be particularly adapted for use in conditioning filaments, fibers, yarns, films and other shaped articles composed of or containing a vinyl resin so as to obviate or minimize their tendency to accumulate static charges of electricity. Examples of vinyl resins, more particularly thermoplastic vinyl resins, which can have antistatic characteristics imparted thereto by means of our new sulfosuccinate salts, are polyacrylonitrile, copolymers of acrylonitrile and a different vinyl compound such, for instance, as vinyl chloride, copolymers of vinyl acetate and vinyl chloride, etc. Other examples of vinyl resins to which the sulfosuccinate salts employed in practicing the present invention advantageously can be applied as antistatic agents are given in the copending application of Arthur Cresswell, Serial No. 68,372, filed December 30, 1948, now Patent 2,597,708 dated May 20, 1952. The sulfosuccinate salts can be applied either alone to the base material or they may be applied in conjunction with a conventional textile lubricant, e. g., an alkyl ester of a long-chain fatty acid, or with a conventional wetting and/or dispersing agent, a detergent, etc.

The aforementioned sulfosuccinate salts not only are capable of imparting antistatic characteristics to thermoplastic vinyl resins and other articles which normally, when dry, have a tendency to accumulate electrostatic charges, but in general they are also able to effect this result without detrimentally affecting the color, tensile strength, elasticity, flexibility, chemical resistance, bacterial and fungal resistance, and other valuable properties of the vinyl resin; in other words, without rendering the vinyl resin article (or other material that is treated) in any way unsuited for its intended purpose.

In using the sulfosuccinate salts of the kind embraced by Formula I as antistatic agents, they are preferably applied in the form of a liquid dispersion, more particularly an aqueous dispersion, to the thermoplastic vinyl resin or other article being treated. This dispersion may contain any suitable amount of sulfosuccinate salt, but ordinarily the salt is present in the dispersion in an amount corresponding to from about 0.5% to about 5% by weight thereof. The dispersion may be applied, for example, by immersing the fiber (or other shaped article formed of vinyl resin or other material) in the dispersion, or by spraying, padding, brushing or otherwise contacting the shaped article with the dispersion. In applying the dispersion, it is preferably heated to an elevated temperature, e. g., from about 45° or 50° C. to about 95° C., or in some cases even as high as 100° C. The dispersion may be applied at room temperature (20-30° C.) or at temperatures up to 45° C., but the lower temperatures are usually less desirable because of the somewhat greater difficulty in maintaining some of the sulfosuccinate salts homogeneously dispersed in water or other liquid dispersion medium at the lower temperatures. Upon drying the fiber or other shaped article at room temperature or at an elevated temperature, e. g., on heated drying rolls, the treated article has the sulfosuccinate salt deposited at least on the outer surfaces thereof. The amount of sulfosuccinate salt which is present in or on the dried, treated article may vary considerably, but ordinarily it is present therein or thereon in an amount, by weight, corresponding to from about 0.2% to about 4% of the dried, untreated article.

It is not essential that the sulfosuccinate salt be used as the sole antistatic agent or effect agent which is present in the aqueous dispersion. In some cases, however, it is advantageous to use the salt alone, since, because of the long-chain aliphatic grouping, more particularly an aliphatic hydrocarbon grouping and specifically an alkyl grouping, which is present therein, it is capable of functioning both as a lubricating agent and as an antistatic agent. In other cases it may be desirable to use the sulfosuccinate salt in conjunction with a conventional textile lubricant and/or other conditioning agent or agents which are commonly employed in finishing compositions used in treating, for example, thermoplastic vinyl resins in fiber, film or other form. Such auxiliary conditioning agents include mineral, vegetable and animal oils, among which latter may be mentioned blown and unblown neatsfoot oil, sperm oil, olive oil, teaseed oil, peanut oil, soya bean oil and cottonseed oil, as well as the various sulfonated oils, e. g., sulfonated olive oil. Examples of other conditioning agents that may be employed in combination with the sulfosuccinate salt are wetting and dispersing agents of various kinds, for example, N-octadecyl disodium sulfosuccinamate, dioctyl sodium sulfosuccinate, etc., lecithin, esters of long-chain fatty acids, advantageously esters of fatty acids which contain from 12 to 18 carbon atoms, inclusive, e. g., alkyl stearates, palmitates and oleates, more particularly the methyl, ethyl, propyl, butyl, amyl, hexyl, etc., stearates, palmitates and oleates.

The finishing compositions containing an antistatic agent comprising a sulfosuccinate salt of the kind embraced by Formula I may be applied to, for instance, a shaped thermoplastic vinyl resin, for example, yarns of associated filaments of such a resin, in the course of the production of the yarn or other shaped article, or subsequent to the production of the yarn and before or after any textile operations in which such yarns are used, especially those operations which include or involve a winding operation. By applying the finishing composition in the course of producing the filaments or fibers, the application may suffice for subsequent textile operations. If desired, however, the textile-treating agent containing the described antistatic agent may be applied both during the process of producing the yarns as well as later when these yarns are fabricated into textile fabrics.

The sulfosuccinate salts also may be applied to, for instance, thermoplastic vinyl resins when the latter are in gelled form. For example, we may apply a liquid treating agent to a fiber in gel state, more particularly an aquagel state, and in which the solid phase comprises an acrylonitrile polymerization product, more particularly such a product which contains in the molecules thereof an average of at least about 85% by weight of combined acrylonitrile, which treating agent comprises an aqueous dispersion containing a sulfosuccinate salt of the kind embraced by Formula I. Thereafter the thusly treated, gelled fiber is dried, for example by continuously passing the fiber over heated drying rolls as is described more fully in Cresswell's copending application Serial No. 68,370, filed December 30, 1948, now abandoned in favor of application Serial No. 73,078, filed January 27, 1949, as a continuation-in-part of said application Serial No. 68,370, now Patent No. 2,558,731, dated July 3, 1951. In this way the sulfosuccinate salt imparts antistatic characteristics to the fiber both during and after drying thereof.

The sulfosuccinate salts used in practicing the present invention are especially suitable for use in the treatment of water-swollen, oriented or unoriented fibers, films, etc., which have been produced as described, for example, in Cresswell's copending application Serial No. 772,200, filed September 4, 1947, now Patent No. 2,558,730, dated July 3, 1951, and in the aforementioned copending application Serial No. 68,370, as well as in the treatment of the dried products, whereby the tendency of the dried material to accumulate static charges of electricity is obviated or minimized and a treated material which, in general, is softer to the touch is obtained.

As has been mentioned hereinbefore, any suitable method may be employed in applying the sulfosuccinate salt or a finishing composition or textile-treating agent containing the same to the thermoplastic vinyl resin or other base material in fiber, film or other form, and it may be applied at any suitable stage of the production of the shaped article, or during its fabrication into other forms, or to the finished, fabricated article and prior to or during its service use. For example, if the conditioning agent is to be applied to the yarn after spinning, the yarn may be brought into contact with a wick, roll or felt which has been wetted with an aqueous or other dispersion or emulsion containing the sulfosuccinate salt. Alternatively, the liquid finishing composition containing the salt may be applied to the article by immersing the article in a bath containing the same, or by spraying, brushing, coating or otherwise applying the finishing composition to the article. Examples of points during the production of a yarn at which the conditioning agent may be applied are during stretching of a wet spun yarn or fiber to orient the molecules thereof, or between any of the guides or godets or other rolls employed in the spinning process, or between the guide and the point of winding and/or twisting; or, the conditioning agent may be applied to the yarn after winding onto cones, spools, bobbins or the like; or, in the case of staple fiber manufacture, the conditioning agent may be applied to the yarn either prior to or after cutting the yarn into staple lengths.

If desired, the sulfosuccinate salt which is deposited in or on the treated article may be allowed to remain in place during and after the production of the article in its ultimate form. Generally, however, the applied conditioning agent comprising the sulfosuccinate salt is removed either prior to dyeing or, if it has been applied to the dyed article, prior to the sale of the article to the trade. The conditioning agent may be removed, if desired, from yarns, fabrics and the like containing the same by means of the usual aqueous scouring baths.

The preferred vinyl resin which is subjected to treatment in accordance with one embodiment of our invention is polymeric acrylonitrile or thermoplastic copolymeric acrylonitrile containing in its molecules a substantial amount of combined acrylonitrile. Of such copolymeric acrylonitriles, we prefer to treat an acrylonitrile copolymer containing in the polymer molecules an average of at least about 85% by weight of combined acrylonitrile. In such copolymeric polymerization products, the proportions of monomers in the polymerizable mixture from which the copolymers are made preferably are adjusted so that the final copolymer contains in the molecules thereof an average of at least about 85% by weight of acrylonitrile (combined acrylonitrile). By the expression "acrylonitrile polymerization product containing in the molecules thereof an average of at least about 85% by weight of combined acrylonitrile," we mean a polymerization product (polymer, copolymer or interpolymer or mixture thereof) containing in its molecules an average of at least about 85% by weight of the acrylonitrile unit, which is considered to be present in the individual polymer molecule as the group

CH₂CH—CN or, otherwise stated, at least about 85% by weight of the reactant substance converted into and forming the polymerization product is acrylonitrile (combined acrylonitrile). Examples of monomers which may be employed in the preparation of such copolymers of acrylonitrile have been given hereinbefore and in the aforementioned Cresswell copending applications.

The use of salts of the kind embraced by Formula I in the treatment of thermoplastic vinyl resins to obviate or lessen the tendency of such materials to accumulate charges of electricity thereon has numerous advantages, among which may be mentioned their relatively lower cost as compared with others which have been suggested for this same general purpose; their ease of application (e. g., as aqueous dispersions); the fact that they do not form insoluble compounds in dispersions in hard water; their effectiveness both as antistatic agents and in lubricating and softening the shaped article in yarn or other form, whereby the treated yarn, film or other article is rendered more amenable to further processing or fabricating (e. g., weaving, knitting, etc., in the case of yarns); their compatibility with other conditioning agents commonly employed in finishing compositions used in treating fibers and other shaped articles; their ease of removal from the treated article, when such removal appears to be desirable for subsequent processing or use of the article; their non-harmful effect upon the thermoplastic vinyl resin or other material which is subjected to treatment; as well as other advantages.

The term "yarn" as used generically herein includes within its meaning a single filament, a plurality of filaments associated into the form of a thread and which may be of any desired twist, single or multiple threads associated or twisted together, as well as staple fibers produced from filaments or threads and spun yarn produced from such staple fibers. The term "fiber" as used generically herein includes within its meaning both monofilaments and multifilaments.

In order that those skilled in the art better may understand how the present invention can be carried into effect, the following examples are given by way of illustration and not by way of limitation. All parts and percentages are by weight.

EXAMPLE 1

*Mono-n-dodecyl diguanidine sulfosuccinate*

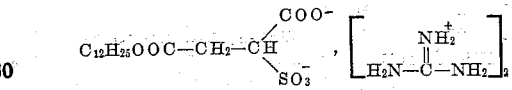

Eighty-three (83) parts of n-dodecyl alcohol (B. P. 128°–130° C. at 10 mm. pressure) was added slowly with stirring to 44.6 parts of maleic anhydride at a temperature of 55° C. The addition required 15 minutes, during which period the temperature rose to 70° C. Heating was continued at 70°–75° C. for another 90 minutes, yielding a maleic mono-ester of n-dodecyl alcohol.

A solution of 88.5 parts of guanidine sulfite in approximately 700 parts of water was prepared and heated to 95° C. The maleate half ester was added to this solution with stirring over a period of 35 minutes. Heating was continued for another 2 hours, yielding a product which weighed 879 parts and contained approximately 24.7% of mono-n-dodecyl diguanidine sulfosuccinate. It was a clear, colorless solution which foamed readily. The sulfosuccinate salt can be recovered from this solution, if desired, by evaporation of the water.

EXAMPLE 2

*Mono-n-octadecenyl diguanidine sulfosuccinate*

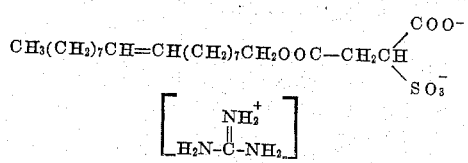

Fifty (50) parts of maleic anhydride was melted and heated to 60° C., after which 127 parts of n-octadecenyl alcohol was added thereto over a period of 15 minutes while maintaining the mass at 60°–80° C. The reaction mixture was heated for another 90 minutes at 70°–75° C.

The maleic mono-ester of n-octadecenyl alcohol, produced by the above reaction, was added slowly over a period of 80 minutes to a solution of 99 parts of guanidine sulfite in approximately 700 parts of water. The reaction mixture was maintained at a temperature of about 94° C. during the addition and for another 60 minutes thereafter. The resulting clear solution formed a white paste on cooling. The yield was 959 parts of pasty mass which contained about 29% of mono-n-octadecenyl diguanidine sulfosuccinate. The solid product is obtained merely by evaporation of the water from this pasty mass.

EXAMPLE 3

*Mono-n-octadecyl diguanidine sulfosuccinate*

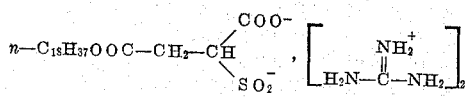

Eighteen hundred ninety-four (1894) parts of n-octadecyl alcohol and 714 parts of maleic anhydride were mixed and melted together at 50°–55° C. after which the mixture was further heated to 75° C. Heating was then discontinued and the temperature rose to 95° C. The temperature was maintained at 85°–95° C. for one hour while stirring the mass. The acid number of the reaction mass was 158 (theoretical acid number 152). After heating for an additional 30 minutes the product was poured into a container and allowed to cool. The maleic monoester of n-octadecyl alcohol was a hard, white wax. It was obtained in a yield of 2605 parts, which corresponds to 100% of the theoretical.

One hundred eighty-four (184) parts of the mono-ester produced as above described was melted and added in portions, with vigorous stirring, to a solution of 99 parts of guanidine sulfite in about 1000 parts of water at 90° C. There was considerable foaming and about 12 parts of ethyl alcohol was added to assist in breaking the foam. The addition required two hours, and stirring was continued for another hour at the same temperature (90° C.). The resulting product formed a clear, very viscous gel. Upon cooling, it was a stiff, white paste containing about 24% of mono-n-octadecyl diguanidine sulfosuccinate. A paste containing 65% of solids was obtained by centrifuging the 24% paste. The sulfosuccinate salt can be recovered from these pastes, if desired, by evaporation of the liquid. A 2% aqueous solution of the sulfosuccinate salt was clear at 40°–50° C. The product crystallized from this solution upon cooling to room temperature.

The product of this example is particularly useful not only as an antistatic agent, but also as a softener for textiles, e. g., cotton fabrics. In the latter applications the sulfosuccinate salt is applied to the textile as an aqueous dispersion containing a small amount (e. g., 0.25 to 1%) of the salt, after which the impregnated textile is dried.

EXAMPLE 4

*Mono-n-octadecyl bis-(biguanide) sulfosuccinate*

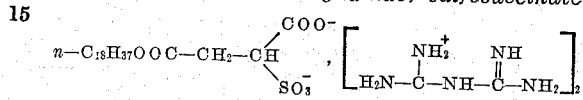

A solution of 142 parts of biguanide sulfite in 900 parts of water was added slowly to a refluxing solution of 184 parts of mono-n-octadecyl maleate in 240 parts of ethanol at such a rate that reflux was maintained during the addition. The mixture was then stirred for 6 hours while maintaining the mass at the reflux temperature. Upon cooling, a white, pasty slurry containing approximately 29% of mono-n-octadecyl bis-(biguanide) sulfosuccinate was obtained. This sulfosuccinate can be obtained in solid form by evaporation of the water and alcohol from the slurry, or by centrifuging and drying the product in the air.

EXAMPLE 5

*Mono-n-octadecyl bis-(n-butylguanidine) sulfosuccinate*

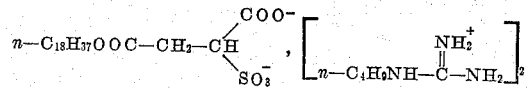

A solution containing 23 parts of n-butylguanidine sulfite in 650 parts of water was prepared by treating n-butylguanidine sulfate with a slurry of calcium hydroxide, filtering off the precipitate of calcium sulfate which forms, and adding the required amount of sulfur dioxide to form the sulfite salt of the n-butylguanidine. The resulting solution was added to 28 parts of mono-n-octadecyl maleate in 260 parts of ethanol at 90°–95° C. The resulting mixture was heated for 4 hours under reflux at the boiling temperature of the mass to yield a clear solution. On cooling, the product crystallized to give a slurry containing about 13% of mono-n-octadecyl bis-(n-butylguanidine) sulfosuccinate. This sulfosuccinate can be isolated from the slurry by filtration and drying in the air.

EXAMPLE 6

*Mono-n-octadecyl bis-(methylguanidine) sulfosuccinate*

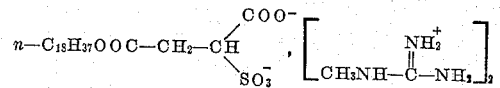

A solution containing 89 parts of methylguanidine sulfite was prepared in exactly the same manner as the n-butylguanidine sulfite in the preceding example. The resulting solution was added to 144 parts of mono-n-octadecyl maleate dissolved in 550 parts of ethanol at such a rate as to maintain the mixture at reflux temperature. The mixture was stirred for an additional 6 hours under reflux, yielding a white paste on cooling.

This paste contained approximately 16% of mono-n-octadecyl bis-(methylguanidine) sulfosuccinate, which can be recovered as such by evaporation of the water and alcohol.

EXAMPLE 7

*Mono-n-octadecyl bis-(2-hydroxyethylguanidine) sulfosuccinate*

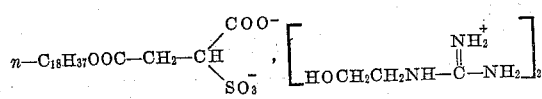

A slurry of 100 parts of guanidine hydrochloride in 400 parts of sec.-butyl alcohol was treated with a solution of 23 parts of metallic sodium dissolved in 400 parts of sec.-butyl alcohol. The precipitated sodium chloride was removed by filtration, and the resulting solution of guanidine in sec.-butyl alcohol was then concentrated under vacuum. To the alcoholic solution of guanidine was added 44 parts of ethylene oxide at 75° C. over a period of 1¼ hours, after which the reaction mixture was stirred for an additional 30 minutes at this same temperature. A viscous, orange-colored liquid comprising 2-hydroxyethylguanidine was obtained upon removal of the solvent under vacuum. The 2-hydroxyethylguanidine was dissolved in sufficient water to form 500 ml. of solution. To this solution there was added 38 parts of sulfur dioxide, thereby producing a solution of 2-hydroxyethylguanidine sulfite.

A solution of 92 parts of mono-n-octadecyl maleate in 200 parts of ethanol was heated to reflux. To this solution was slowly added a solution containing 72 parts of 2-hydroxyethylguanidine sulfite in 250 parts of water. This mixture was stirred for 6 hours under reflux, yielding a clear solution. Upon cooling, the solution formed a white, pasty mass containing approximately 29% mono-n-octadecyl bis-(2-hydroxyethylguanidine) sulfosuccinate. This sulfosuccinate can be recovered in solid form by evaporation of the solvents.

EXAMPLE 8

*Mono-n-octadecyl bis-(phenylbiguanide) sulfosuccinate*

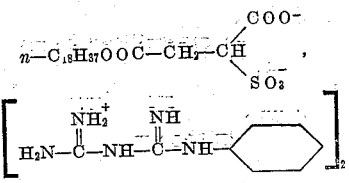

A solution of phenylbiguanide sulfite in water was prepared in exactly the same manner described under Example 5 with reference to the preparation of n-butylguanidine sulfite. This solution, containing 157 parts of phenylbiguanide sulfite in 400 parts of water, was added slowly to a solution of 133 parts of mono-n-octadecyl maleate in 480 parts of ethanol at the reflux temperature of the mass. The resulting reaction mixture was stirred under reflux for an additional 4 hours, yielding a clear solution. Upon cooling, this solution formed a slurry containing about 27% of mono-n-octadecyl bis-(phenylbiguanide) sulfosuccinate, which can be recovered as such by evaporation of the solvents, or by filtration and air-drying.

EXAMPLE 9

*Mono-n-octadecyl bis-(phenylguanidine) sulfosuccinate*

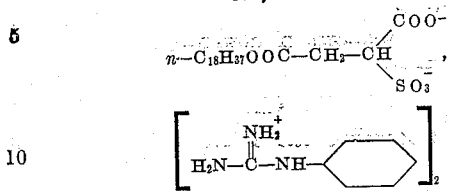

A solution containing 88 parts of phenylguanidine sulfite in 500 parts of water was prepared by treating an aqueous solution of phenylguanidine carbonate with sulfur dioxide. To the aqueous solution of the phenylguanidine sulfite there was added 92 parts of mono-n-octadecyl maleate in 400 parts of ethanol. The resulting mixture was heated at the reflux temperature of the mass for 4 hours, forming a clear solution at the end of this reaction period. Upon cooling, the solution formed a grey, oily paste containing about 20% of mono-n-octadecyl bis-(phenylguanidine) sulfosuccinate, which can be recovered in solid form by evaporation of the solvents.

EXAMPLE 10

*Mono-n-octadecyl bis-(guanylurea) sulfosuccinate*

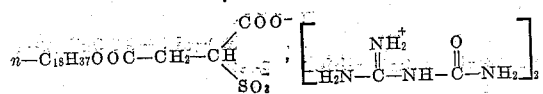

A solution containing 143 parts of guanylurea sulfite in 750 parts of water was prepared from guanylurea sulfate by the procedure described under Example 5 with reference to the preparation of n-butylguanidine sulfite. This solution was added to 184 parts of mono-n-octadecyl maleate in 200 parts of ethanol at the reflux temperature of the mass and at such a rate that the mixture remained clear all the time. The resulting mixture was stirred under reflux (80°–90° C.) for 4 hours, yielding a clear, amber-colored solution. When this solution was cooled, it formed a slurry containing approximately 29% of mono-n-octadecyl bis-(guanylurea) sulfosuccinate. This sulfosuccinate can be recovered from the slurry by evaporation of the solvents.

EXAMPLE 11

*Mono-(3-stearoyloxy-2-hydroxypropyl) diguanidine sulfosuccinate*

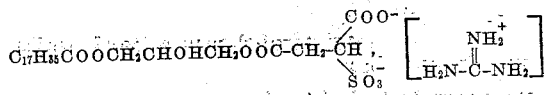

A mixture of 340 parts of technical-grade, distilled glyceryl monostearate and 100 parts of maleic anhydride was melted and thereafter heated with stirring for 4 hours at 85°–90° C., yielding mono-(3-stearoyloxy-2-hydroxypropyl) maleate. This mono-ester was a light yellow wax having an acid number of 134 (theoretical acid number 129). It was obtained in a yield of 427 parts, which was 97% of the theoretical.

One hundred fifty (150) parts of the aforementioned maleic mono-ester was added in portions with stirring over a period of 2 hours to a solution containing 68 parts of guanidine sulfite in about 300 parts of water while maintaining the temperature of the mass at 90°–95° C. After stirring the mixture for another 1½ hours at the same temperature, the pH of the mass was adjusted to 6.6. The solution was then evaporated on a steam bath. A light tan, crystalline wax was obtained upon drying the residue at 100° C. The yield of mono-(3-stearoyloxy-2-hydroxypropyl) diguanidine sulfosuccinate was 218 parts, which was 100% of the theoretical yield. It is especially suitable for use as a softener for textiles, especially cotton and rayon fabrics, since it has a good softening effect upon the textile, while the treated textile shows little or no tendency to yellow under heat, e. g., during drying, ironing, etc.

EXAMPLE 12

*Mono-(2-stearoyloxyethyl) diguanidine sulfosuccinate*

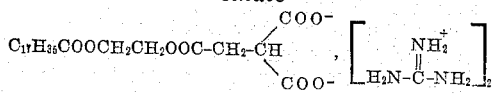

The procedure for the preparation of the above compound is the same as that described under Example 11 with reference to the production of mono-(3-stearoyloxy-2-hydroxypropyl) diguanidine sulfosuccinate with the exception that 328 parts of technical-grade 2-hydroxyethyl stearate is used instead of 340 parts of technical-grade, distilled glyceryl monostearate. The product is initially obtained in the form of a light cream-colored paste, which can be evaporated to a solid if desired.

EXAMPLE 13

*Mono-(2-stearamidoethyl) diguanidine sulfosuccinate*

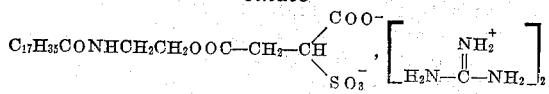

2-Hydroxyethylstearamide was prepared by refluxing a technical grade of stearic acid with a 10% excess of monoethanolamine in xylene solution until water no longer was evolved. The resulting solution was stripped of xylene and excess amine to obtain 2-hydroxyethylstearamide as a light tan wax. A mixture of 200 parts of the 2-hydroxyethylstearamide and 61 parts of maleic anhydride was melted and stirred for 2 hours at 93°–105° C. The resulting mono-(2-stearamidoethyl) maleate was a light tan wax having an acid number of 128 (theoretical acid number 132).

A solution of 23 parts of guanidine sulfite in about 190 parts of water was heated to 85° C. To the resulting solution there was added 51 parts of the aforementioned mono-(2-stearamidoethyl) maleate over a period of 30 minutes while maintaining the temperature of the mass at 80°–85° C. Heating and stirring were continued for 3 hours after the addition of the mono-ester. The resulting product was a thick, yellow paste containing about 29% of mono-(2-stearamidoethyl) diguanidine sulfosuccinate, which can be recovered as such by evaporation of the water.

EXAMPLE 14

*Mono - [5,7,7 - trimethyl - 2 - (1,3,3 - trimethylbutyl) octyl] diguanidine sulfosuccinate*

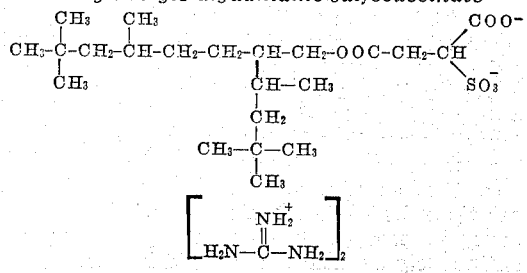

A solution of 176 parts of 5,7,7-trimethyl-2-(1,3,3-trimethylbutyl)-octanol-1, 68 parts of maleic anhydride and 3 parts of p-toulenesulfonic acid in 220 parts of toluene was refluxed for 6 hours at 110° C. The reaction mass was concentrated by distilling off a portion of the toluene under vacuum, after which it was cooled and filtered to remove p-toluenesulfonic acid and unreacted maleic anhydride. The remainder of the toluene was stripped from the filtrate under vacuum, yielding 227 parts (95% of the theoretical) of the maleic mono-ester as a yellow-oil.

To a solution of 110 parts of the aforementioned maleic mono-ester in 320 parts of ethanol, there was added a solution of 65 parts of guanidine sulfite in about 500 parts of water. The resulting mixture was heated under reflux with stirring for 3 hours. This solution was then stirred with a decolorizing carbon, after which the carbon was removed by filtration. Upon evaporation there was obtained 180 parts of a sticky, white paste comprising mono-[5,7,7-trimethyl-2-(1,3,3-trimethylbutyl)octyl] diguanidine sulfosuccinate.

EXAMPLE 15

This example illustrates the treatment of various materials, more particularly textile materials, with sulfosuccinate salts of our invention in order to impart antistatic properties to the material undergoing treatment.

Pieces of different kinds of fabrics, specifically fabrics of wool, viscose rayon and acetate twill, 9 x 23 inches in size, were run through 1% aqueous solutions of the sulfosuccinate salts of Examples 1 to 10, inclusive, while maintaining the solutions at 120° F. The impregnated fabrics were then passed through a pad mangle so as to obtain a wet pick-up of approximately 100%. The samples were framed and then dried for 5 minutes at 250° F. After air-drying for 3 days, the fabrics were further dried over anhydrous calcium chloride for a week. The fabrics were placed in a 25° C., 50% relative-humidity atmosphere for 7 days before electrostatic measurements were made on threads taken from each of the treated fabrics.

The testing apparatus consisted of a 0–15,000 volt D. C. power source, a horizontal charging wire 14 inches long which was supported by two insulating pillars, a thin gauge cylindrical steel enclosure 11 inches in diameter and 8 inches high which served to shield and to maintain a uniform electric field about the charging wire, a circular scale for measuring displacements, a mirror for reflecting the image of the scale, and a glass topped wooden box which housed the charging unit and shielded the operator from electrical contact.

The procedure followed in making a measurement was to crimp a pair of threads of suitable length in a soldering lug and to suspend this assembly on the charging wire. An electrostatic charge was imparted to the threads by raising the potential of the wire from 0 to 10,000 volts D. C. at the rate of approximately 2000 volts per second. The threads were maintained at 10,000 volts for a suitable period, usually a minute, for the charge to become stabilized on the thread. Since the threads were charged with the same polarity, they repelled each other with a displacement directly related to the quantity of charge transferred. The displacement of the threads was measured by visually projecting the ends of the threads on a mirror scale consisting of concentric circles whose radii differed by 0.2 inch. At the end of the charging period, the charging source was grounded and the time required for the threads to discharge to a displacement of 0.4 inch was recorded. Discharge rates were calculated by dividing the projected linear distance of travel for a thread by the time required to reach the fixed end point. The values reported in Table I, which follows, are in each case the average of the measurements obtained on five pairs of threads stripped from each fabric. The reported values are the discharge rates in inches per second $\times 10^5$; in other words, the figures given in the table are 100,000 times the actual averages. The results on a control sample, wherein the fabric was treated with water alone, also are given in this table.

TABLE I

| Sulfosuccinate of Example No. | Kind of Fabric | | |
|---|---|---|---|
| | Wool | Viscose Rayon | Acetate Rayon Twill |
| Control | 74 | 4,800 | 3 |
| 1 | | | 5,800 |
| 2 | | | 6,400 |
| 3 | | | 2,870 |
| 4 | | | 700 |
| 5 | 104 | | 204 |
| 6 | | 12,300 | 272 |
| 7 | | 5,500 | 23,700 |
| 8 | | | 14.3 |
| 9 | | 7,600 | 16.4 |
| 10 | | | 20 |

EXAMPLE 16

This example illustrates the use of a mixture of aliphatic monohydric alcohols in preparing a sulfosuccinate salt of the kind embraced by Formula I. More particularly there was used in this example "Lorol B" which is a mixture of long-chain aliphatic monohydric alcohols sold by E. I. du Pont de Nemours & Company of Wilmington, Delaware, and having the following approximate composition:

| | Approximate per cent |
|---|---|
| Lauryl alcohol | 55 |
| Tetradecanol | 20–25 |
| Hexadecanol | 10–15 |
| Octadecanol | 10 |

*Preparation of maleic mono-ester*

| | Parts | Approximate moles |
|---|---|---|
| "Lorol B" | 832 | 4.0 |
| Maleic anhydride (98%) | 408 | 4.08 |

The above ingredients were mixed and heated to 75° C., forming a two-phase liquid mixture. Heating was discontinued, and in 15 minutes the mixture became homogeneous and the temperature rose to 80° C. The reaction mass was maintained at 73°–77° C. by intermittent heating (after cooling from 80° C.) for 2 hours. The acid numbers of samples taken at the end of 1-hour and 2-hour reaction periods were 196 and 197, respectively. The maleic mono-ester produced by the reaction was a yellow oil which solidified upon cooling below 50° C. The yield was 1233 parts which corresponds to 99% of the theoretical yield.

*Preparation of "Lorol B" diguanidine sulfosuccinate*

| | Parts | Approximate moles |
|---|---|---|
| Maleic mono-ester produced as described above | 620 | 2.0 |
| Guanidine bisulfite (3 molar) | 790 | 2.04 |
| Guanidine carbonate (97%) | 190 | 1.02 |
| Water | 1,775 | |

The guanidine carbonate was dissolved in the water and the bisulfite solution was added slowly thereto while stirring the mass. When evolution of carbon dioxide had largely ceased, the solution was heated. The maleic mono-ester was melted and added to the sulfite solution over a period of 1 hour while maintaining the mass at 80°–90° C. Evolution of carbon dioxide and considerable foaming occurred during the addition of the first half of the maleic mono-ester. The addition was complete in 1 hour, and heating of the resulting clear, colorless solution was continued for an additional 1½ hours to complete the sulfonation. The solution was then allowed to cool for approximately 16 hours. The product crystallized and formed a slurry. Upon warming this solution to 40° C. a slightly cloudy solution was obtained. Dilution of this solution with water yielded a clear, colorless, strongly foaming solution having a pH of 5.3. The weight of the solution was 3311 parts containing 30.6% of the sulfosuccinate salt, which can be isolated as such, if desired.

As will be understood by those skilled in the art, the product identified above as "Lorol B" diguanidine sulfosuccinate is a mixture of diguanidine sulfosuccinic esters corresponding to the monohydric alcohols present in "Lorol B."

EXAMPLE 17

This example illustrates the use of "Lorol B" diguanidine sulfosuccinate as an antistatic agent in the treatment of an acrylonitrile polymerization product. The acrylonitrile polymerization product was a copolymer of about 95% acrylonitrile and 5% methyl acrylate, and had a molecular weight of approximately 78,000 as calculated by the Staudinger equation from a viscosity measurement (reference: U. S. Patent No. 2,404,713). A spinning solution was produced from this copolymer by dissolving 7.5% of it in 92.5% of a 48% aqueous solution of calcium thiocyanate. After filtering and de-aerating, the solution had a viscosity of 37.2 sec. as determined by the time for a Monel ball, ⅛ inch in diameter, to fall through 20 cm. of the solution maintained at 61° C.

The spinning solution was spun into a fiber (continuous filament yarn) by continuously extruding it through a 40-hole spinnerette with holes of 90 microns diameter into a coagulating bath comprising water maintained at a temperature of about +1° C. The solution was heated inside the spinnerette prior to extrusion to about 75°–80° C. by means of a steam-heated "finger." The solution was pumped through the spinnerette at the rate of about 8.05 cc. per minute. From the coagulating bath the wet, gelled fiber was led at the rate of 9.2 meters per minute over a pair of revolving rolls which were slightly inclined (i. e., converged) toward each other at the delivery end, thereby to advance the gelled fiber over the rolls while traveling in a helical path. During its passage over these rolls the fiber was continuously washed with a liquid treating agent comprising water maintained at a temperature of about 0° to 5° C. From the wash rolls the fiber passed through a trough containing water maintained at a temperature of about 99.5° C. and thence through a bath of an antistatic composition made by diluting the slurry of Example 16 with water to form an aqueous solution containing about 2% of "Lorol B" diguanidine sulfosuccinate. This antistatic composition was maintained at a temperature of about 50°–60° C. From the antistatic bath the fiber was continuously led to a pair of heated drying rolls which revolved at a higher peripheral speed than the aforementioned wash rolls, so that the fiber was stretched approximately 693% during its passage through the hot-water stretch bath. The drying rolls also converged slightly toward each other at the delivery end so that the fiber advanced in a helical form over their surfaces. The surface temperature of the drying rolls was about 70°–75° C. The dried fiber was then given an after-heat treatment, while in a relaxed state and free to contract linearly, in essentially the same manner described in the copending application of Arthur Cresswell and Irvin Wizon, Serial No. 97,786, filed June 8, 1949, now Patent No. 2,558,733, dated July 3, 1951. The continuously running fiber was rapidly passed in relaxed state through a short, heated zone maintained at a temperature of about 400° C. and was then twisted and taken up on a collecting bobbin. The retraction effected by passing the fiber in relaxed state through the heating zone was 5½%. The final take-up speed was approximately 60.3 meters per minute.

The effectiveness of "Lorol B" diguanidine sulfosuccinate as an antistatic agent was evidenced by the fact that there was no filament "ballooning" during the passage of the fiber over the drying rolls. Furthermore, the finished thread did not accumulate an electrostatic charge when stroked either with the hand or with a strip of cellulose acetate.

EXAMPLE 18

This example illustrates the use of octadecyl diguanidine sulfosuccinate as an antistatic agent in the treatment of an acrylonitrile polymerization product, specifically a copolymer of about 95% acrylonitrile and 5% methyl acrylate having a molecular weight of about 79,600 as calculated by the Staudinger equation from a viscosity measurement. The same apparatus and essentially the same procedure were followed in this example as were described in the preceding example.

A spinning solution was prepared from the acrylonitrile-methyl acrylate copolymer by dissolving 9.7% of it in 90.3% of an approximately 50% aqueous solution of sodium thiocyanate. After filtering and de-aerating, the solution had a viscosity of 28.5 sec. as determined in the manner described under Example 17. This solution was spun into a fiber by pumping the solution through the 40-hole spinnerette at the rate of about 4.82 cc. per minute. The wet, gelled fiber was led in the form of helices at the rate of about 6.0 meters per minute over the pair of revolving wash rolls. The washed, gelled fiber was stretched 590% while passing through water maintained at about 99° C., after which the stretched fiber was led through the bath of antistatic composition comprising a 2% aqueous solution of octadecyl diguanidine sulfosuccinate and maintained at a temperature of about 60° C.

The yarn ran well on the drying rolls and there was no "ballooning" of the filaments, indicating that the sulfosuccinate salt had been effective in imparting antistatic characteristics to the yarn. The continuously running fiber was passed in relaxed state through a heated zone maintained at about 280° C., the retraction which was effected by this treatment being approximately 11.9%. The final take-up speed, as the yarn was twisted and taken up on a collecting bobbin, was 31.2 meters per minute.

The finished yarn did not develop any electrostatic charge when stroked either with the hand or with a piece of cellulose acetate in strip form. This is in marked contrast to the results obtained when octadecyl disodium sulfosuccinate is similarly applied, since this compound was found to be ineffective in imparting antistatic properties to a fiber of an acrylonitrile polymerization product.

EXAMPLE 19

This example illustrates the use of an antistatic finishing composition containing octadecyl diguanidine sulfosuccinate and a lubricant, specifically butyl stearate, in the treatment of an acrylonitrile polymerization product, more particularly homopolymeric acrylonitrile having a molecular weight of approximately 90,000. A spinning solution was prepared by dissolving 6.94% of homopolymeric acrylonitrile in 93.06% of a 50% aqueous solution of calcium thiocyanate. The viscosity of this solution was 25.7 sec. as determined by the method described under Example 17.

The solution of polyacrylonitrile was spun by extruding it at about 70°–80° C. through a 40-hole spinnerette having hole diameters of 90 microns into a spinning bath comprising water at 1–2° C. The coagulated fiber was carried back and forth through the bath by means of a power-driven, submerged godet placed at one end of the bath and a set of free-running rollers at the other end. The total bath travel of the fiber was about 144 inches. Upon leaving the coagulating bath the yarn was subjected during its travel to a stretch of about 730% in a water bath maintained at 98°–99° C. From the stretch bath, the gelled fiber was led through an antistatic bath consisting of water having dispersed therein 2% of octadecyl diguanidine sulfosuccinate and 0.5% butyl stearate. This antistatic bath was maintained at a temperature of about 50°–60° C. Thereafter the treated fiber was led over a pair of heated, converging, drying rolls maintained at a surface temperature of about 75° C. and thence, in relaxed state, through a heated zone maintained at a temperature of about 280° C. The treated yarn ran well on the drying rolls and there was no filament "ballooning" of the fibers during drying, indicating that the antistatic treatment had been effective. The retraction effected by passing the thread in relaxed state through the heating zone was 15.8%. The yarn, as collected on the collecting bobbin, contained about 1.5% of "finish" (octadecyl diguanidine sulfosuccinate plus butyl stearate) and showed no signs of accumulating an electrostatic charge when stroked either with the hand or with a strip of cellulose acetate.

EXAMPLE 20

The following fibers produced from other thermoplastic vinyl resins were used in this example:

1. Orlon (a polyacrylonitrile fiber).
2. Vinyon (made from a high-molecular weight copolymer of about 88–90% vinyl chloride and about 12–10% vinyl acetate)

3. Vinyon N (made from a copolymer of about 60% vinyl chloride and about 40% acrylonitrile)

Dry swatches of the above fibers became readily charged with static electricity when stroked with the hand.

Each of the dry swatches was immersed in an aqueous solution containing about 2% of octadecyl diguanidine sulfossuccinate for about 1 or 2 minutes, the solution being maintained at a temperature of about 50°–60° C. during the treatment, after which they were dried first at room temperature and then in an oven maintained at about 60° C. for about 60 minutes. The dry, treated swatches did not develop any electrostatic charge when stroked either with the hand or with a piece of cellulose acetate in strip form.

It will be understood, of course, by those skilled in the art that our invention is not limited to the use of the specific sulfosuccinate salts described in the above illustrative examples, since other compounds of the kind embraced by Formula I similarly can be prepared and used as antistatic agents or for other purposes.

Because of the long-chain aliphatic radical which they contain, the sulfosuccinate salts of the kind covered by Formula I are capable of functioning both as a lubricating agent and as an antistatic agent for treating textile and other materials. They are useful not only in improving the useful properties of textile fibers and fabrics which, in a dry state, normally accumulate static charges of electricity, but also various other shaped or formed articles, e. g., phonograph records made of vinyl resins, vinyl or other plastic materials in sheet or film form, photograph films formed of a cellulose ester or other material that tends to accumulate an electrostatic charge, etc.

In addition to their use as antistatic agents, the aforementioned sulfosuccinate salts are also useful as non-durable softening agents for various textile materials, especially those made of cotton or rayon. Those which are particularly useful for this purpose are the sulfosuccinate salts that cause no serious yellowing, if any, when the fabrics treated therewith are heated, e. g., for three days at 95° C. In general, our new compounds are capable of softening or plasticizing starch finishes, and do not cause any changes in shade or decrease in the light-fastness of dyes when applied to dyed fabrics.

We claim:

1. The method of conditioning a shaped article comprising a thermoplastic vinyl resin to lessen its tendency to accumulate static charges of electricity thereon, said method comprising applying to the said article a volatile liquid containing a sulfosuccinate salt represented by the general formula

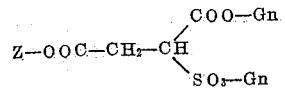

wherein Z represents a grouping of the class consisting of (a) R—,
(b) R'—COO—R''— and
(c) R'—CONH—R'' and wherein R and R' each represents a long-chain aliphatic hydrocarbon radical and R'' represents a radical of the class consisting of alkylene radicals and hydroxyalkylene radicals each containing from 2 to 5 carbon atoms, inclusive, an Gn represents a cationic salt-forming substance of the class consisting of guanidine, lower-alkylguanidines, phenylguanidines, alkylolguanidines, guanylurea, biguanide and phenylbiguanides, and the amount of the said liquid containing the said salt which is applied to the said article being such that the finished article has associated therewith from, by weight, 0.2% to 4% of the said salt, based on the weight of the dry, untreated article, and drying the thusly treated article.

2. A method as in claim 1 wherein the thermoplastic vinyl resin contains in its molecules a substantial amount of combined acrylonitrile.

3. A method as in claim 1 wherein the sulfosuccinate salt comprises dodecyl diguanidine sulfosuccinate.

4. A method as in claim 1 wherein the sulfosuccinate salt comprises octadecyl diguanidine sulfosuccinate.

5. A method as in claim 1 wherein the sulfosuccinate salt comprises octadecyl bis-(2-hydroxyethylguanidine) sulfosuccinate.

6. A method as in claim 1 wherein the sulfosuccinate salt comprises octadecyl bis-(guanylurea) sulfosuccinate.

7. A method as in claim 1 wherein the shaped article is a yarn comprising fibers of a thermoplastic product of polymerization of a polymerizable mass comprising a preponderant proportion by weight of acrylonitrile.

8. The method which comprises applying a liquid treating agent to a fiber in gel state and in which the solid phase comprises an acrylonitrile polymerization product containing in the molecules thereof an average of at least about 85% by weight of combined acrylonitrile, said treating agent comprising an aqueous liquid containing a sulfosuccinate salt represented by the general formula

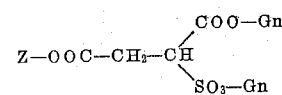

wherein Z represents a grouping of the class consisting of (a) R—,
(b) R'—COO—R''— and
(c) R'—CONH—R'' and wherein R and R' each represents a long-chain aliphatic hydrocarbon radical and R'' represents a radical of the class consisting of alkylene radicals and hydroxyalkylene radicals each containing from 2 to 5 carbon atoms, inclusive, and Gn represents a cationic salt-forming substance of the class consisting of guanidine, lower-alkylguanidines, phenylguanidines, alkylolguanidines, guanylurea, biguanide and phenylbiguanides, and drying the thusly treated, gelled fiber, the said sulfosuccinate salt imparting antistatic characteristics to the said fiber during and after drying thereof, and the amount of the said treating agent which is applied to the said fiber being such that the dried fiber has associated therewith from, by weight, 0.2% to 4% of the said sulfosuccinate salt, based on the weight of the dried, untreated fiber.

9. A shaped article comprising a thermoplastic vinyl resin which in a dry state normally has a tendency to accumulate static charges of electricity thereon, said article having deposited at least on outer surfaces thereof a sulfosuccinate salt represented by the general formula

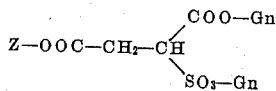

wherein Z represents a grouping of the class consisting of (a) R—,
(b) R'—COO—R''— and
(c) R'—CONH—R'' and wherein R and R' each represents a long-chain aliphatic hydrocarbon radical and R'' represents a radical of the class consisting of alkylene radicals and hydroxyalkylene radicals each containing from 2 to 5 carbon atoms, inclusive, and Gn represents a cationic salt-forming substance of the class consisting of guanidine, lower-alkylguanidines, phenylguadinines, alkylolguanidines, guanylurea, biguanide and phenylbiguanides, and said sulfosuccinate salt lessening the tendencies of the said article to accumulate static charges of electricity thereon and being associated with the said article in an amount corresponding to from 0.2% to 4% of the weight of the dry, untreated article.

10. A textile formed of fibers including fibers of a thermoplastic product of polymerization of polymerizable vinyl compound including acrylonitrile, said textile in a dry state normally having a tendency to accumulate static charges of electricity thereon and, to lessen this tendency, having deposited at least on outer surfaces thereof an antistatic agent comprising a sulfosuccinate salt represented by the general formula

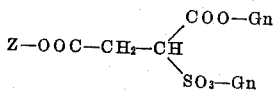

wherein Z represents a grouping of the class consisting of (a) R—,
(b) R'—COO—R''— and
(c) R'—CONH—R'' and wherein R and R' each represents a long-chain aliphatic hydrocarbon radical and R'' represents a radical of the class consisting of alkylene radicals and hydroxyalkylene radicals each containing from 2 to 5 carbon atoms, inclusive, and Gn represents a cationic salt-forming substance of the class consisting of guanidine, lower-alkylguanidines, phenylguanidines, alkylolguanidines, guanylurea, biguanide and phenylbiguanides, the amount of the said sulfosuccinate salt which is associated with the said textile corresponding to from 0.2% to 4% of the weight of the dry, untreated textile.

11. Textile fibers formed of an acrylonitrile polymerization product containing in the molecules thereof an average of at least about 85% by weight of combined acrylonitrile, said fibers having deposited at least on outer surfaces thereof a conditioning agent comprising octadecyl diguanidine sulfosuccinate, which compound lessens the tendencies of the said fibers to accumulate static charges of electricity thereon and constitutes from 0.2% to 4% of the weight of the dry, untreated fibers.

JOSEPH J. CARNES.
WILLIAM T. BOOTH, Jr.

References Cited in the file of this patent

FOREIGN PATENTS

| Number | Country | Date |
|---|---|---|
| 565,675 | Great Britain | Nov. 22, 1944 |